Jan. 16, 1973   S. BASTACKY   3,711,332
LEAD GEL STORAGE BATTERY
Filed Sept. 9, 1971
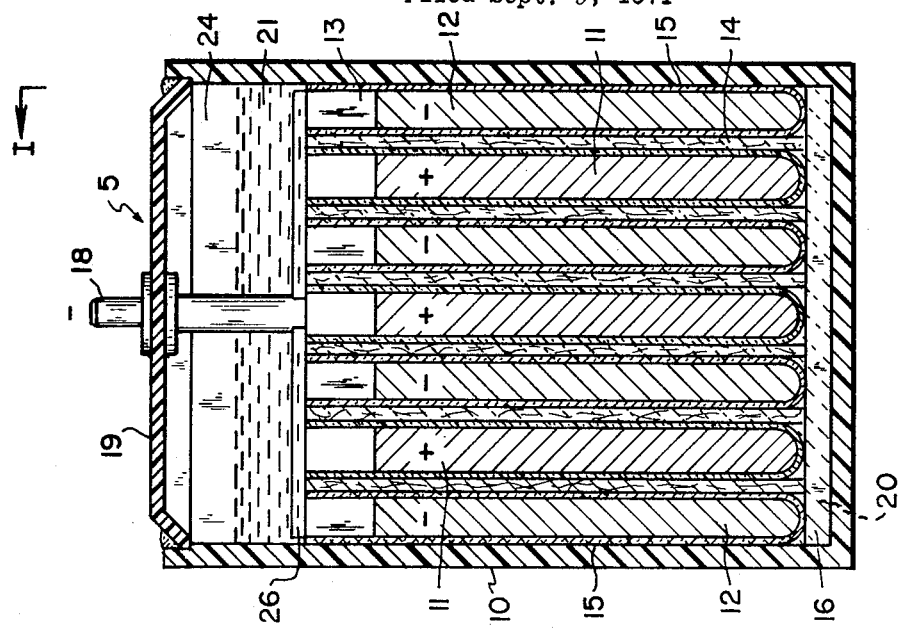
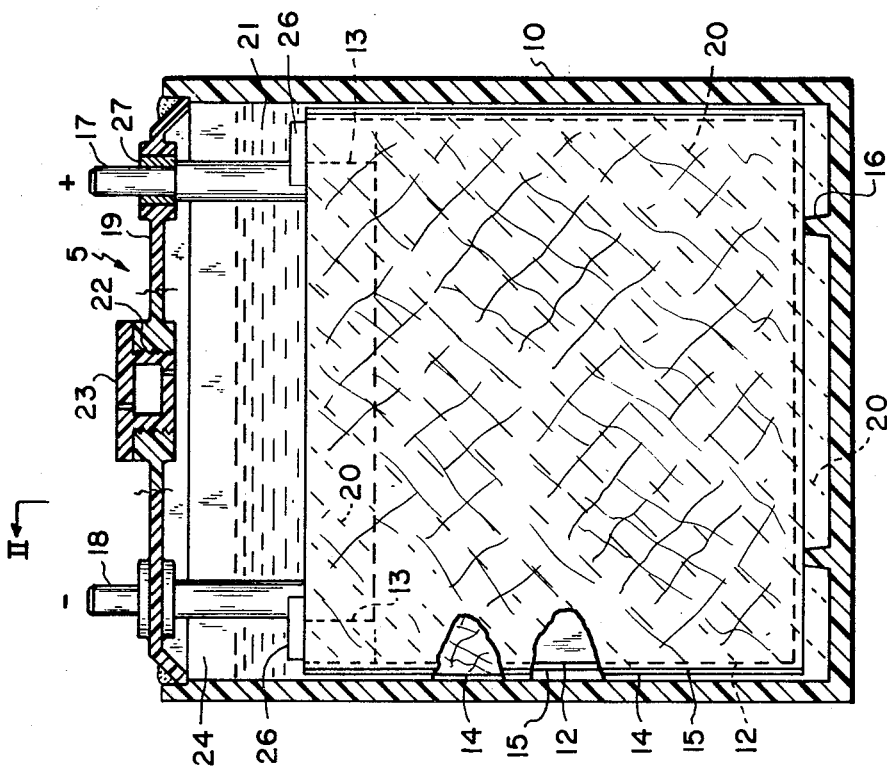
INVENTOR.
Simon Bastacky
BY
Webb Burden Robinson &
Webb
HIS ATTORNEYS

3,711,332
LEAD GEL STORAGE BATTERY
Simon Bastacky, 6604 Dalzell Place, Pittsburgh, Pa. 15217
Continuation-in-part of abandoned application Ser. No. 5,063, Jan. 22, 1970. This application Sept. 9, 1971, Ser. No. 179,000
Int. Cl. H01m 39/00
U.S. Cl. 136—26                                                7 Claims

ABSTRACT OF THE DISCLOSURE

A lead acid storage battery wherein the electrolyte is in gel form. A sodium silicate solution is mixed with a sulphuric acid of approximately 1.310 specific gravity in the ratio of from 1:6 to 1:10 and immediately thereafter is poured into a lead cell storage battery in which porous glass fiber separators maintain the space between the positive and negative plates. A gel electrolyte forms shortly thereafter. A space is maintained between the gel and the top of the battery to accommodate a liquid phase which forms from the gel.

---

This is a continuation-in-part application of my earlier filed, copending application Ser. No. 5,063, filed Jan. 22, 1970, now abandoned.

My invention relates to lead acid storage batteries and more particularly to rechargeable lead cell storage batteries in which the electrolyte is in gel form.

The lead cell storage battery is the most common of the various electric cells which convert chemical energy into electrical energy. The lead cell generally consists of positive and negative plates, separated by wood, hard rubber, glass fiber or other fibrous material separators and a dilute sulphuric acid electrolyte; the various components being positioned in a hard rubber, plastic or glass battery case. The active material on the plates is a lead peroxide which is generally a thin film pasted on a cast lead-antimony grid. The basic reaction, which is reversible, is as follows:

(1)    

The equation proceeds from left to right during discharging and from right to left during charging.

The disadvantages of standard lead acid storage batteries are well known. It is known that lead cells gradually lose their usefulness through loss of active material from the plates, shorting of the cells through accumulation of oxide at the bottom of the battery, deterioration of separators, etc. Perhaps an even greater drawback, especially in a constantly used storage battery, is the amount of maintenance that goes into the routine filling of the cells with water. There are also well-known drawbacks from the standpoint of safety, since handling batteries with the sulphuric acid electrolyte is quite hazardous. In addition to the obvious safety hazards, the acid fumes from the electrolyte and the spillage resulting from overfilling the cells with water have deleterious effects through corrosion on the surrounding areas. Further, a standard lead acid storage battery is prone to freezing and cracking in cold weather if it is weakly charged.

Regardless of size, the voltage of a lead cell is approximately two volts. However, the capacity varies from cell to cell depending on the number of plates and the amount of active material on the positive plates.

Gel electrolytes, per se, in lead acid storage batteries are not new. However, in todays marketplace, there are no acceptable storage batteries in which the electrolyte is in gel form. The reason for this is that heretofore the exacting gel formulation and battery construction necessary to produce batteries which comply with existing standards was not known.

My invention provides a storage battery having a gel electrolyte which is virtually maintenance free. My battery, even with continuous use, does not require the addition of water for months on end.

My invention also provides a storage battery which will not freeze under the same conditions which will not freeze under the same conditions which will freeze and crack a standard battery.

My invention further eliminates acid fumes, electrolyte spillage and the other problems associated with a liquid electrolyte.

My invention virtually eliminates the shorting out of cells from oxide buildup, since the oxide which flakes off the plates is absorbed in the gel and does not collect on the bottom of the battery.

Because there can be no spillage with my battery, the handling, shipment and routine movement of my battery can be done in a much easier manner than known heretofore.

My invention is a rechargeable lead gel cell storage battery. The electrolyte is a gel formed in situ in the battery from the addition thereto of a particular admixed combination of a sodium silicate solution and a sulphuric acid having a specific gravity of about 1.310. A porous glass fiber separator is used between the plates. A space is built into the battery cover above the top of the gel to accommodate a liquid phase which forms from the gel; which is absorbed by the gel during discharge; which forms again during charging; and which minimizes along with the gel, the escape of gases from the battery.

In the accompanying drawings, I have shown a presently preferred embodiment of my invention in which:

FIG. 1 is a section through a battery of my invention; and

FIG. 2 is a section taken along lines II—II of FIG. 1.

I have shown in FIGS. 1 and 2 a single cell industrial battery for ease of presentation, but it will be recognized by those skilled in the art that additional cells can be added in known ways to form batteries of the desired voltage and capacity. It will be apparent that my invention is applicable to a variety of storage batteries, which may differ from one another in design because of intended use. For example and not for purposes of limitation, my invention is applicable to stationary batteries having a life of 10 to 25 years, such as telephone batteries signal batteries, batteries for computer stations and auxiliary batteries for all the various means of transportation such as diesel locomotive and car lighting systems. These stationary batteries are generally permanently attached to a charging device. By the same token, my invention is applicable to batteries in continuous use such as golf carts, floor scrubbers and other cleaning equipment. Handling equipment such as mine tractors can also employ my batteries.

In order to accommodate the gel electrolyte, my battery 5 differs in design from the normal storage battery construction. A typical battery case 10, shown in FIG. 1, is made up of any standard casing material such as rubber, plastic or glass. The positive and negative plates 11 and 12, respectively, having standard tabs 13 are made of a lead base alloy. I have found that I obtain my best performance by adding antimony in amounts of about 3.0 to 4.5 percent to the lead, although the more conventional antimony contents of 5–12.0 percent, as well as other known alloys, can also be employed. These plates 11 and 12 generally are produced in grid form.

The active material on both the positive and negative plates is lead peroxide. I prefer using a pure lead oxide which is a combination of red lead and litharge rather than metallic lead oxides. The grid is pasted with the lead oxide to form the plates although other less common constructions can also be employed. I have found for best performance that the positive plate should have a lead oxide coating comprising about one-quarter to one-third red lead and the balance litharge, whereas the negative plate should have a lead oxide coating comprising about nine-tenths litharge and one-tenth red lead.

The thickness of the plates varies depending on the application, but I have found that where a large capacity is required, such as for golf cart batteries, a thickness of about .088 inch is ideal for both the positive and negative plates. In this way, the capacity can be increased by increasing the number of plates. In a stationary battery or handling equipment batteries as shown in FIGS. 1 and 2 the thickness of the positive plate is about .250 inch and the negative plate is about .185 inch.

I have found that the particular means of separating the positive and negative plates is very critical in that the space therebetween must also accommodate the gel electrolyte. In order to provide the spacing and also accommodate the gel, I have found that a porous glass fiber separator should be used. The porous nature of the separator readily accommodates the gel which forms therein. Such a separator 14 is depicted in FIG. 2.

In addition to the separator, in industrial batteries, I prefer to wrap both the positive and negative plates in a thin glass mat 15, FIG. 2. This mat acts as a retaining layer which increases the life of the battery by helping maintain the lead oxide coating during cycling, i.e. discharging and charging. In practice the glass mat 15 extends beyond the plate, and the separator 14 extends slightly beyond the glass mat 15 to a point immediately adjacent but not abutting the casing 10, FIG. 1. In batteries with thin plates and narrow spacings therebetween, I merely insert the porous glass fiber separator between the plates.

The space between the positive and negative plates is quite critical in that two wide a space deleteriously affects the capacity of the battery and too narrow a space limits the amount of electrolyte formed therein. I have found that for stationary batteries and handling equipment batteries, the distance between the positive and negative plates should be about .125 inch, and for golf carts and cleaning equipment, the distance should be about .075 inch to .080 inch. All positive plates are connected to one another by a lead bridge 26, welded to the plate tabs 13, as are the negative plates by ways well known in the art. The positive and negative plates 11 and 12, which are alternatively positioned with respect to each other are positioned in battery case 10 on a bridge 16 which keeps the plates from contacting the bottom of the case 10. Positive and negative terminals 17 and 18, respectively, are joined by means such as brazing to the positive and negative group of plates, 11 and 12, respectively, through the particular bridge 26 therebetween. A top cover 19 is placed over the battery case 10. The cover 19 has standard openings 22 which can be used to add the electrolyte, as described hereinafter, and vented plugs 23 for checking the battery and safety purposes, although my battery does eliminate the acid fumes. The terminals 17 and 18 extend through the top cover and include lead sleeves 27 welded thereto which cooperate with the top cover 19.

The battery 5, after being assembled to this stage, is ready for charging. The charging of the battery is routine but varies slightly from manufacturer to manufacturer. I prefer the following: My battery is initially filled with sulphuric acid of about 1.100 specific gravity and charged in a known manner until the plates have 2.65 volts per cell, gravity and charged until the negative plates again test the positive plates. The acid is then drained and the battery is again refilled with sulphuric acid of 1.390 specific i.e. (—.25) volts on the negative plates and 2.4 volts on out at least (—.25) volts and the positive plates test out at least 2.4 volts. The battery 5 is again emptied of its sulphuric acid.

The battery 5 is now ready for the permanent gel electrolyte 20. The gel electrolyte 20 is prepared as follows: One part of sodium silicate, having a Baumé of 41.3 at 60° F. and a general formula of $Na_2O \cdot x(SiO_2)$ is mixed with one part distilled water or a demineralized water having less than 5,000 ohms electrical resistance to form the sodium silicate solution. A dilute sulphuric acid is also prepared having a specific gravity of about 1.310. The dilute sulphric acid is then added to the sodium silicate solution in about the ratio of 6 parts by volume sulphuric acid to 1 part by volume sodium silicate solution to 10 parts by volume sulphuric acid to 1 part by volume sodium silicate solution. This electrolyte solution is immediately poured into the battery to a level just above the plates 11 and 12.

The gel 20 will start to form in about twenty minutes at ambient temperature and, therefore, it must be prepared immediately prior to its addition to the battery. It is important that air bubbles are not entrapped in the gel 20 and, therefore, the electrolyte solution should be added to one side of the cell forcing the air out of the other side and thus avoiding the entrapment of air. The electrolyte solution will fill the battery 5, including all the spaces between the plates 11 and 12. The gel 20, when formed, expands slightly, and will likewise provide a continuous and complete electrolyte totally encapsulating the plates 11 and 12 of the battery. After about 4–6 hours, a liquid phase forms on top of the gel. Therefore there are two phases present, one the gel and two, the liquid phase.

I have found that the specific gravity of the acid and the ratio of the gel solution to the acid is very critical. The reasons for this are many. In the first place, the gel 20 must form the liquid phase 21 above the gel. This liquid phase gradually goes into the gel during discharging and comes out again during charging. This liquid phase substantially contributes to the elimination of gas fumes as tests have shown. A rapid charge of the battery creates gaseous bubbles which must pass upward through the gal and then the liquid phase cover which forms thereabove. These bubbles can actually be seen forming, yet the typical odor from the standard lead acid storage batteries is not present. Additional tests have included igniting the gases given off from a standard lead acid storage battery and from the subject battery. The standard battery fumes ignite with a tremendous explosion as compared to gases which escape from the subject battery. A related circumstance arises if the specific ratios result in a thick liquid rather than a distinct gel phase and liquid phase thereover. In other words, the thick liquid does not minimize acid fumes, avoid spillage, etc. to the extent of my two phase system.

Another very important consideration is that a gel does provide some resistance to the passage of current, the amount of resistance depending on the composition and consistency of the gel. In other words, a very thick gel tends to crystallize and greatly increase the resistance to current flow.

The following table summarizes several of these tests which show the criticality of the gel formulation. The tests were run on golf cart batteries designated GC2 by Battery Council International, successor to the Association of American Battery Manufacturers. These batteries which are very popular are in general used on golf carts, electric trucks, handling equipment, personnel pallet trucks, floor scrubbers, etc. The Battery Council International has an established standard for such batteries, namely a capacity test of 75 amperes for 75 minutes to 5.25 volts at 80° F. The table sets forth the average results of triplicate tests run on an automatic Reco discharge tester for various gel formulations.

TABLE

| Sulphric acid, specific gravity | Ratio of gel solution to acid | Discharge time (min.), average of three tests | Comments |
|---|---|---|---|
| 1.290 | 1:4 | 60 | Too low. |
|  | 1:6 | 69 | Do. |
|  | 1:8 | 70 | Do. |
|  | 1:10 | 68 | Do. |
|  | 1:12 | 69 | Liquid phase only. |
|  | 1:15 | 70 | Do. |
| 1.310 | 1:4 | 65 | Tendency to crystallize. |
|  | 1:6 | 75 | O.K. |
|  | 1:8 | 81 | Excellent. |
|  | 1:10 | 77 | O.K. |
|  | 1:12 | | Liquid phase only. |
|  | 1:15 | | Do. |
| 1.320 | | | Do. |

It can be seen from the table that at high acid specific gravities, the gel does not form along with the desired liquid phase thereof, but instead a single thick liquid phase forms thereby defeating the safety and maintenance free characteristics of the battery. On the other hand, at low specific gravities or at low ratios of gel solution to acid, the discharge time does not meet the acceptable standards. In order to obtain optimum properties, one should operate with an acid having a 1.310 specific gravity and a ratio of gel solution to acid of 1:6 to 1:10.

The electrolyte solution can be added before the cover 19 is placed on the battery 5 or can be added through the opening 22 in the cover 19. In either event, a space 24 must be left between the gel and the cover 19. This space is necessary because of the liquid phase which forms above the gel. As stated, this liquid phase is absorbed into the gel during discharge of the battery but forms again above the gel during charging. It has been found that the space should be about twice the thickness of the liquid phase on top of the gel in the charged state. This permits the battery to be rapidly charged without overflow and also permits the battery to "breathe." The overall dimensioning of the battery is important because of the two phases present and the need for additional space below the battery cover. In general the plates, exclusive of the tabs, will be two-thirds of the height from the bottom bridge to the battery cover. The remaining one-third of that height is equally divided between the remainder of the gel, the liquid phase and the air space, respectively.

If desired, the liquid phase can be removed prior to shipment and then a small amount of water added to the battery prior to its use.

A battery of my invention prepared as set forth heretofore has operated in a hospital as a stationary battery for a 48 volt system with a permanent charging connection (.3 amps. charging). The battery which has a 100 amp. hour capacity has been installed for more than eight months without requiring the addition of any water.

A group of my batteries, 36 volt systems, were installed in electric golf carts and used daily. Again, the batteries (some with 180 and some with 215 amp. hour capacities) operated over extended periods, 5–6 months, without the need for water.

Many batteries have been produced within the narrow critical limits of the gel formulation set forth herein. These batteries have proven satisfactory from the standpoint of capacity discharge as well as the maintenance free characteristics of the gel electrolyte.

The life of the battery is now increased because the oxide which breaks off the plates is taken up in the gel rather than collected at the bottom of the battery to cause premature shorting. There are neither fumes, spillage or corrosion associated with the batteries, and since water need not be added for extended periods of time, my batteries are virtually maintenance free.

I claim:
1. A rechargeable lead storage battery comprising:
   (A) a battery case;
   (B) positive and negative lead base plates, said positive and negative plates alternately positioned in the battery case in spaced apart relationship, said plates having a lead oxide coating on the surface thereof;
   (C) means for maintaining said plates above the bottom of the battery case;
   (D) porous glass fiber separator means positioned between said positive and negative plates to maintain said spaced apart relationship;
   (E) a gel electrolyte consisting of a mixture of sodium silicate, distilled or demineralized water and sulphuric acid of about 1.310 specific gravity, the sodium silicate and said water forming a sodium silicate solution of about 1:1, respectively, and said sulphuric acid and said sodium silicate solution being present in amounts of from 6:1 to 10:1, respectively, to form said gel, said gel electrolyte substantially filling said case including said space between plates and just thereabove, said electrolyte forming a liquid phase above the gel; and
   (F) a battery cover, said cover closing said battery case to form a space between said cover and said gel, said space being about twice the thickness of the liquid phase on top of the gel.

2. The storage battery of claim 1 wherein the sodium silicate is characterized by a Baumé of 41.3 at 60° F.

3. The storage battery of claim 1 wherein the lead base plates contain 3.0 to 4.5 weight percent antimony.

4. The storage battery of claim 1 wherein the lead oxide consists of red lead and litharge.

5. The storage battery of claim 1 wherein said plates are wrapped within said separator means.

6. The storage battery of claim 1 wherein the plates are dimensioned to a height of about two-thirds the distance between the maintaining means and the battery cover, the remaining one-third of said distance being equally divided between the gel, the liquid phase and the space, respectively.

7. The storage battery of claim 3 wherein said positive plates have a lead oxide coating consisting of from one-quarter to one-third red lead and the balance litharge and said negative plates consisting of a lead oxide coating of about one-tenth red lead and nine-tenths litharge.

References Cited

UNITED STATES PATENTS

| | | | |
|---|---|---|---|
| 1,389,750 | 9/1921 | Gardiner | 136—144 |
| 1,416,195 | 5/1922 | Hacking | 136—157 |
| 1,417,007 | 5/1922 | Williams | 136—158 |
| 1,572,586 | 2/1926 | Weir | 136—26 |
| 3,257,237 | 6/1966 | Jache | 136—6 |
| 3,457,112 | 7/1969 | Reber | 136—26 |

ANTHONY SKAPARS, Primary Examiner

U.S. Cl. X.R.

136—157

UNITED STATES PATENT OFFICE
CERTIFICATE OF CORRECTION

Patent No.     3,711,332     Dated     January 16, 1973

Inventor(s)     Simon Bastacky

It is certified that error appears in the above-identified patent and that said Letters Patent are hereby corrected as shown below:

Column 2 Lines 9 and 10 --which will not freeze under the same conditions-- (second occurrence) should be deleted. Column 3 Line 32, Before the word --beyond-- insert --slightly--.
Col. 3 Line 72, The phrase --gravity and charged until the negative plates again test-- should be deleted and should be inserted after the word --specific-- in line 74. In line 75, the phrase --i.e. (-.25) volts on the negative plates and 2.4 volts on-- should be deleted and should be inserted after the word --cell,-- in line 71. Column 4 Line 17 --battery-- should read --battery 5--. Column 4 Line 43 --gal-- should read --gel--.

Signed and sealed this 29th day of May 1973.

(SEAL)
Attest:

EDWARD M. FLETCHER, JR.            ROBERT GOTTSCHALK
Attesting Officer                       Commissioner of Patents